US008124559B2

(12) United States Patent
Mohtadi et al.

(10) Patent No.: US 8,124,559 B2
(45) Date of Patent: Feb. 28, 2012

(54) DESTABILIZED AND CATALYZED BOROHYDRIDE FOR REVERSIBLE HYDROGEN STORAGE

(75) Inventors: Rana F. Mohtadi, Northville, MI (US); Ragaiy Zidan, Aiken, SC (US); Joshua Gray, Aiken, SC (US); Ashley C. Stowe, Knoxville, TN (US); Premkumar Sivasubramanian, Aiken, SC (US)

(73) Assignees: Toyota Motor Engineering & Manufacturing North America, Inc., Erlanger, KY (US); U.S. Department of Energy, Washington, DC (US)

( * ) Notice: Subject to any disclaimer, the term of this patent is extended or adjusted under 35 U.S.C. 154(b) by 218 days.

(21) Appl. No.: 12/575,557

(22) Filed: Oct. 8, 2009

(65) Prior Publication Data
US 2010/0090162 A1 Apr. 15, 2010

Related U.S. Application Data

(63) Continuation-in-part of application No. 11/130,750, filed on May 17, 2005, and a continuation-in-part of application No. 12/035,710, filed on Feb. 22, 2008, and a continuation-in-part of application No. 12/485,373, filed on Jun. 16, 2009, which is a continuation-in-part of application No. 11/130,750.

(60) Provisional application No. 60/605,177, filed on Aug. 27, 2004.

(51) Int. Cl.
*B01J 23/00* (2006.01)
*B01J 20/00* (2006.01)
*C01B 6/24* (2006.01)
*C01B 3/02* (2006.01)

(52) U.S. Cl. ...... 502/300; 502/400; 423/644; 423/648.1
(58) Field of Classification Search .................. 502/300, 502/400; 423/644, 648.1
See application file for complete search history.

(56) References Cited

U.S. PATENT DOCUMENTS

| 6,106,801 | A | 8/2000 | Bogdanovic et al. |
| 7,094,387 | B2 | 8/2006 | Zidan |
| 2006/0194695 | A1 | 8/2006 | Au |

*Primary Examiner* — Jerry Lorengo
*Assistant Examiner* — Jennifer Smith
(74) *Attorney, Agent, or Firm* — Gifford, Krass, Sprinkle, Anderson & Citkowski, P.C.

(57) ABSTRACT

A process of forming a hydrogen storage material, including the steps of: providing a borohydride material of the formula: $M(BH_4)_x$ where M is an alkali metal or an alkaline earth metal and $1 \leq x \leq 2$; providing an alanate material of the formula: $M_1(AlH_4)_x$ where $M_1$ is an alkali metal or an alkaline earth metal and $1 \leq x \leq 2$; providing a halide material of the formula: $M_2Hal_x$ where $M_2$ is an alkali metal, an alkaline earth metal or transition metal and Hal is a halide and $1 \leq x \leq 4$; combining the borohydride, alanate and halide materials such that 5 to 50 molar percent from the borohydride material is present forming a reaction product material having a lower hydrogen release temperature than the alanate material.

16 Claims, 20 Drawing Sheets

FIG. 1 Dehydriding of the catalyzed borohydrides

FIG. 2 Rehydriding of the catalyzed borohydrides at 600C and 100 Bar

FIG. 4 Isothermal dehydriding of LiBH₄ 75%-TiO₂ 25%

Raman spectra of the destabilized and commercial LiBH$_4$ materials

FIG. 8  Repeated rehydrogenation of the LiBH$_4$ +0.2Mg

FIG. 9 Dehydrogenation of the destabilized and commercial LiBH$_4$ materials

1 — LiBH$_4$ + 0.2 MgCl$_2$ + 0.2 TiCl$_3$
2 — Commercial LiBH$_4$

FIG. 12 Hydrogen desorption of the destabilized $LiBH_4 + 0.5MgH_2 + 0.007TiCl_3$ and commercial $LiBH_4$ FIG. 13 Rehydrogenation of $LiBH_4$ + $0.5MgH_2$ + $0.007\ TiCl_3$ FIG. 14  Hydrogen desorption of the material LiBH$_4$ +0.2Al and commercial LiBH$_4$ FIG. 15 Rehydrogenation of the material LiBH$_4$ +0.2 Al FIG. 16 Hydrogen desorption of the destabilized LiBH$_4$ +0.5LiAlH$_4$ and commercial LiBH$_4$ FIG. 17 Rehydrogenation of the material $LiBH_4 + 0.5LiAlH_4$

DESTABILIZED AND CATALYZED BOROHYDRIDE FOR REVERSIBLE HYDROGEN STORAGE

CROSS-REFERENCE TO RELATED APPLICATIONS

This application is a continuation-in-part of U.S. Utility application Ser. No. 12/485,373, filed on Jun. 16, 2009 and 12/035,710, filed on Feb. 22, 2008 and 11/130,750, filed on May 17, 2005, and which claims the benefit of U.S. Provisional Application No. 60/605,177, filed on Aug. 27, 2004, the specifications of which are incorporated herein by reference.

STATEMENT AS TO RIGHTS TO INVENTIONS MADE UNDER FEDERALLY SPONSORED RESEARCH AND DEVELOPMENT

This invention was made with Government support under Contract No. DE-AC0996-SR18500 awarded by the United States Department of Energy. The Government has certain rights in the invention.

FIELD OF THE INVENTION

The invention relates to hydrogen storage materials, and with more particularity, to hydrogen storage materials having improved thermodynamic properties.

BACKGROUND OF THE INVENTION

Current technologies utilized for gaseous hydrogen storage are limited by the low-volume storage gas density even at very high pressures, such as pressures in the range of 5,000 to 10,000 psi. The energy density by volume of the gaseous hydrogen is less than that of a gasoline energy density. Use of hydrogen as an alternate fuel is limited due to this lower energy density. Cryogenic storage of hydrogen at temperatures of around 20 K may improve the volumetric energy density compared to gaseous storage, but is still less than that for a given amount of energy when compared to gasoline. Additionally, production of liquid hydrogen is energy intensive and requires special considerations due to the low temperature storage to avoid hydrogen boil off and other limitations of liquefied hydrogen.

Chemical storage of hydrogen in a solid, such as borohydride, allows for hydrogen release when heated or mixed with water. However, formation of solid byproducts or release of hydrogen at very high temperatures, usually exceeding the melting point of the borohydride, limits the use of borohydrides. Additionally, borohydrides are not typically able to be rehydrided after hydrogen release.

There is therefore a need in the art for an improved hydrogen storage material that releases hydrogen at lower temperatures and is able to be rehydrided after release of the hydrogen.

SUMMARY OF THE INVENTION

In one aspect, there is disclosed a process of forming a hydrogen storage material, including the steps of: providing a borohydride material of the formula: $M(BH_4)_x$ where M is an alkali metal or an alkaline earth metal and $1 \leq x \leq 2$; providing an alanate material of the formula: $M_1(AlH_4)_x$ where $M_1$ is an alkali metal or an alkaline earth metal and $1 \leq x \leq 2$; providing a halide material of the formula: $M_2Hal_x$ where $M_2$ is an alkali metal an alkaline earth metal or transition metal and Hal is a halide and $1 \leq x \leq 4$; combining the borohydride, alanate and halide materials such that 5 to 50 molar percent from the borohydride material is present forming a reaction product material having a lower hydrogen release temperature than the alanate material.

In another aspect, there is disclosed a process of forming a hydrogen storage material including the steps of: providing a borohydride material of the formula: $M1(BH_4)_x$ where M is an alkali metal or an alkaline earth metal and $1 \leq x \leq 2$; providing an alanate material of the formula: $M_1(AlH_4)_x$ where $M_1$ is an alkali metal or an alkaline earth metal and $1 \leq x \leq 2$; providing a halide material of the formula: $M_2Hal_x$ where $M_2$ is an alkali metal, an alkaline earth metal or transition metal and Hal is a halide and $1 \leq x \leq 4$; combining the borohydride, alanate and halide materials such that 5 to 50 molar percent from the borohydride material is present, the alanate and halide materials reacting in situ forming a second alanate material of the formula $M_2(AlH_4)_x$; the borohydride, alanate, halide and second alanate materials forming a reaction product material having a lower hydrogen release temperature than the second alanate material.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

DETAILED DESCRIPTION OF THE PREFERRED EMBODIMENTS

Figure 1:
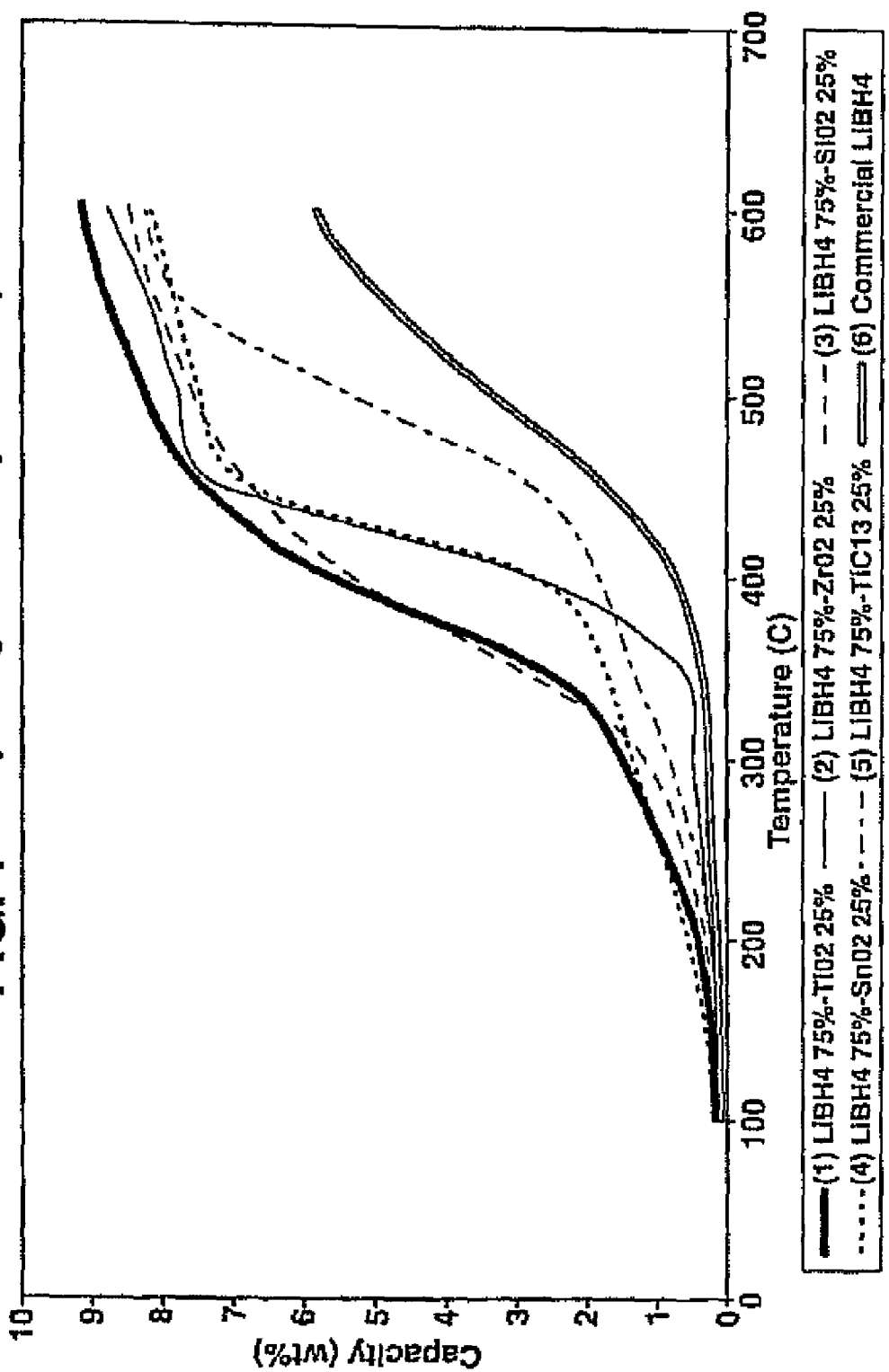
FIG. 1 is a graph showing the dehydriding characteristics of the indicated catalyzed borohydrides and accompanying control $LiBH_4$.

In one aspect of the invention, a hydrogen storage material may be formed from a first material, such as a metal containing borohydride, where the metal may be an alkali metal or an alkali earth metal. The first material may have the formula: M(BH$_4$)$_x$ where M is an alkali metal or an alkaline earth metal and $1 \leq x \leq 2$.

The first material may be combined with a second material, such as a metal alanate of the formula: M(AlH$_4$)$_x$ where $1 \leq x \leq 2$, a mixture of the metal alanate and a metal chloride, a mixture of a metal chloride and aluminum, a mixture of a metal chloride and an alane (AlH$_3$), a mixture of a metal hydride of the formula: MH$_x$ where $1 \leq x \leq 2$ and aluminum or alane, aluminum, and an alane.

The first and second materials may be combined at an elevated temperature and at an elevated hydrogen pressure for a time period to form a material having a lower hydrogen release temperature than the first material and a higher hydrogen gravimetric density than the second material.

Various metal borohydrides may be utilized as the first material, including lithium borohydride, sodium borohydride, potassium borohydride, or combinations of the above materials. Additionally, various alkali earth metals may be included in the metal borohydride and may be selected from magnesium, calcium, strontium, barium, aluminum, and mixtures of the above.

Various metal chlorides may be used in the second material as described above. Such metal chlorides may include including magnesium chloride, calcium chloride, strontium chloride, barium chloride, zirconium chloride, titanium chloride and combinations thereof. It should be realized that while chlorides are outlined for use in certain embodiments various metal halides including bromides and iodides may also be used.

Various metal hydrides may be utilized in the second material as described above, Such metal hydrides may include magnesium hydride, calcium hydride, titanium hydride, and zirconium hydride, and combinations thereof.

As stated above, various alanates may be used where the metal is selected from an alkali metal or an alkali earth metal and may include lithium alanate having the formula LiAlH$_4$, sodium alanate having the formula NaAlH$_4$, and magnesium alanate having the formula Mg(AlH$_4$)$_2$.

In one aspect, the process of forming the hydrogen storage material may include the step of ball milling the first and second materials prior to the step of combining the first and second materials. In the ball milling process, the first and second materials may be introduced into a ball mill and milled to a particle size ranging from about 50 to 100 nanometers.

In one embodiment, a first material or metal borohydride, such as lithium borohydride and a second material, an alanate, may be combined using the ball mixing or milling procedure. Following the ball milling procedure, the mixed material may be subjected to a high temperature treatment at a temperature of up to 300° C. under hydrogen pressures of up to 5,500 psi for a period of time up to 24 hours. The third material formed from the process may have a lower hydrogen desorption temperature and faster desorption kinetics compared to the initial metal borohydride materials. Additionally, the third material of the process may be reversibly hydrogenated after release of an initial hydrogen composition. The third material formed by the process may contain a partially substituted borohydride lithium metal cation with the alanate metal cation, or partially substituted borohydride boron with aluminum, or a partially substituted cation and boron in the borohydride.

In another embodiment, the first material may be a metal borohydride, such as lithium borohydride and the second material may include an alanate and a metal halide such as titanium chloride that may be mixed using the ball mixing procedure. Following the mixing, the first and second materials may be combined at an elevated high temperature of up to 300° C. under hydrogen pressures of up to 5,500 psi for a period of time up to 24 hours. The third material formed by the high temperature treatment may have a lower hydrogen desorption temperature and faster desorption kinetics compared to the initial borohydride materials. The third material formed may be reversibly hydrogenated when an initial hydrogen is removed from the composition. The third material may contain a partially substituted borohydride lithium metal cation with the alanate metal cation, or partially substituted borohydride boron with aluminum, or a partially substituted cation and boron in the borohydride.

In another embodiment, the first material may be a metal borohydride, such as lithium borohydride, and the second material may be a metal halide, such as zirconium chloride or titanium chloride, magnesium chloride or calcium chloride, and aluminum or an alane may be mixed using the ball mixing procedure. The first material and second material may be combined at an elevated temperature of up to 300° C. under hydrogen pressures of up to 5,500 psi for a period of time of up to 24 hours. The third material formed by the high temperature treatment may have a lower hydrogen desorption temperature and faster desorption kinetics compared to the initial borohydride materials. Additionally, the third material of the process may be reversibly hydrogenated after release of an initial hydrogen composition. The third material may include a partially substituted borohydride lithium metal cation with the halide cation, and/or a partially substituted borohydride boron with aluminum, or a partially substituted cation and boron in the borohydride.

In another embodiment, the first material may be a metal borohydride, such as lithium borohydride, and the second material may be a hydride, such as an alkali earth based hydride, such as magnesium hydride, calcium hydride, or a transition metal hydride, such as zirconium hydride, titanium hydride, and aluminum or alane (AlH$_3$), may be mixed using the ball mixing and milling procedure. The first and second materials may be combined in a high temperature treatment at temperatures of up to 300° C. under hydrogen pressures of up to 5,500 psi for a period of time of up to 24 hours. As with the previously described embodiments, the third material of the process may have lower hydrogen desorption temperatures and faster desorption kinetics compared to the first material, and may be reversibly hydrogenated. The third material may be a partially substituted borohydride cation and/or a partially substituted borohydride boron with aluminum, or both a partially substituted cation and anion in the borohydride.

In another embodiment, the first material may be a metal borohydride, such as lithium borohydride, and the second material may be an alane and may be mixed using the ball mixing procedure. The first and second materials may be combined in a high temperature treatment at a temperature of up to 300° C. under hydrogen pressures of up to 5,500 psi for a period of up to 24 hours. The third material of the process may have lower hydrogen desorption temperatures and faster desorption kinetics compared to the first material. Additionally, the third material may be reversibly hydrogenated. The third material may include a partially substituted borohydride cation with aluminum, and/or a partially substituted borohydride boron with aluminum.

In another embodiment, the first material may be a metal borohydride, such as borohydride, and the second material may be aluminum and may be combined using the ball mixing procedure. The ball mixing procedure may be followed by a high temperature treatment at temperatures up to 300° C. under hydrogen pressures of up to 5,500 psi for a period of time of up to 24 hours. The third material of the process may have lower hydrogen desorption temperatures and faster desorption kinetics compared to the first material. The third material may also be reversibly hydrogenated. The third material may include a partially substituted borohydride cation with aluminum, and/or a partially substituted borohydride boron with aluminum.

In another embodiment, a borohydride material may be of the formula $M(BH_4)_x$, $1 \leq x \leq 2$, such as lithium borohydride, and an alanate material may be of the formula $M_1(AlH_4)_x$ where $1 \leq x \leq 2$ and a halide material may be of the formula $M_2Hal_x$ where Hal represents a halogen and $1 \leq x \leq 4$. In one aspect the halide material may be a chloride. The borohydride, alanate and halide materials may be combined using the ball mixing procedure outlined above. The borohydride, alanate and halide materials may be combined such that 5 to 50 molar percent from the borohydride material is present. The ball mixing procedure may be followed by a high temperature treatment at temperatures up to 150° C. under hydrogen pressures of up to 5,000 psi for a period of time of at least one hour.

The alanate and halide materials may react in situ in the presence of the borohydride material forming a second alanate material of the formula $M_2(AlH_4)_x$. The borohydride, alanate, halide and second alanate materials react to form a reaction product material having lower hydrogen desorption temperatures and faster desorption kinetics compared to the alanate material and a combination of the alanate and halide materials. The reaction product material may also be reversibly hydrogenated. The reaction product material formed may be reversibly hydrogenated when an initial hydrogen is removed from the composition.

The reaction product material may contain a partially substituted borohydride lithium metal cation with the alanate metal cation. The reaction product material may also contain a partially substituted borohydride metal cation, with the metal from the halide material with the alanate cation.

Following the ball milling process, mixture samples ranging from approximately 0.250 grams to approximately 0.500 grams were evaluated in a Sieverts volumetric apparatus using a Temperature Programmed Desorption (TPD) from ambient temperature to 600° C. with a heating rate of 5° C./min. The desorption conditions included a backpressure of $P_0=5.4$ mbar. The results of the hydrogen desorption are set forth in FIG. 1 as samples 1-5 corresponding to Table 1 along with the appropriate control of commercially available $LiBH_4$ (100%) (Sample 6).

Figure 2:
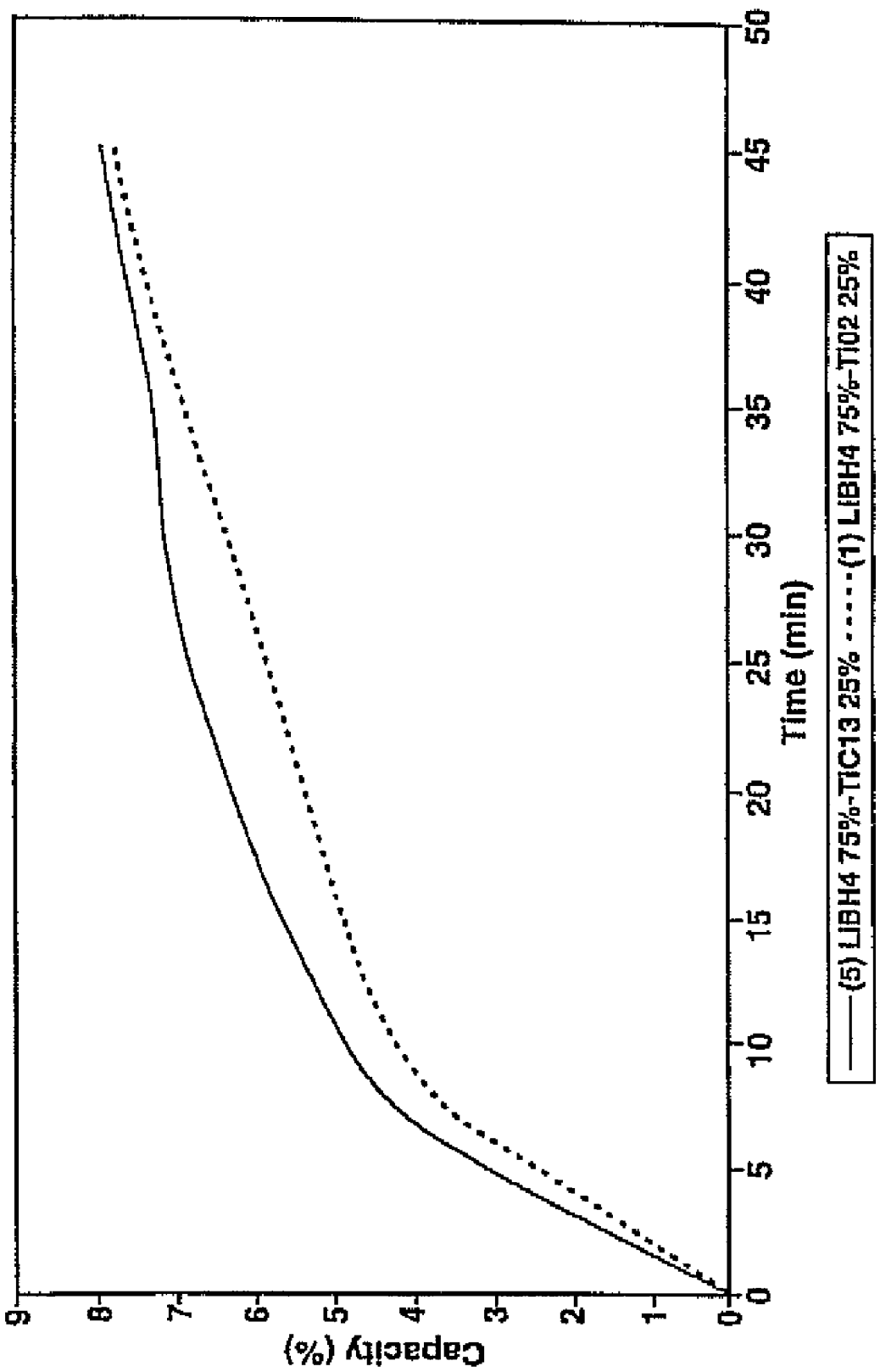
FIG. 2 is a graph showing the rehydriding capability of the catalyzed borohydrides at 600° C. and 100 bar.

Following the hydrogen desorption, the desorbing material was rehydrided at 600° C. and 100 bar of hydrogen for 45 minutes. As indicated in FIG. 2, the percent of hydrogen absorbed for the indicated materials is reflected on the Y axis.

Figure 3:
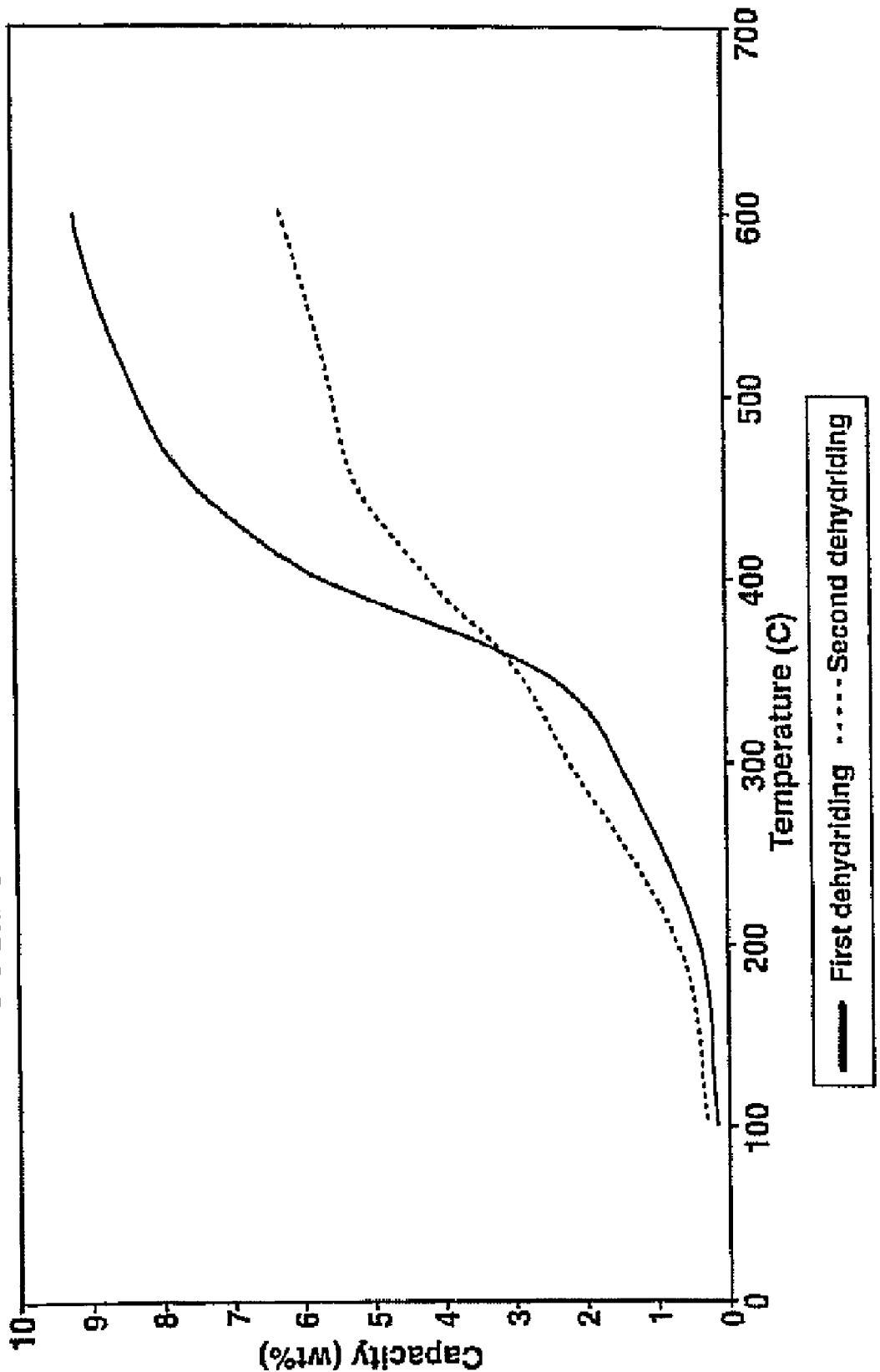
FIG. 3 is a graph setting forth the first and second cycle hydrogen release characteristics of $LiBH_4$ 75%-$TiO_2$ 25% at the indicated temperatures.
Figure 4:
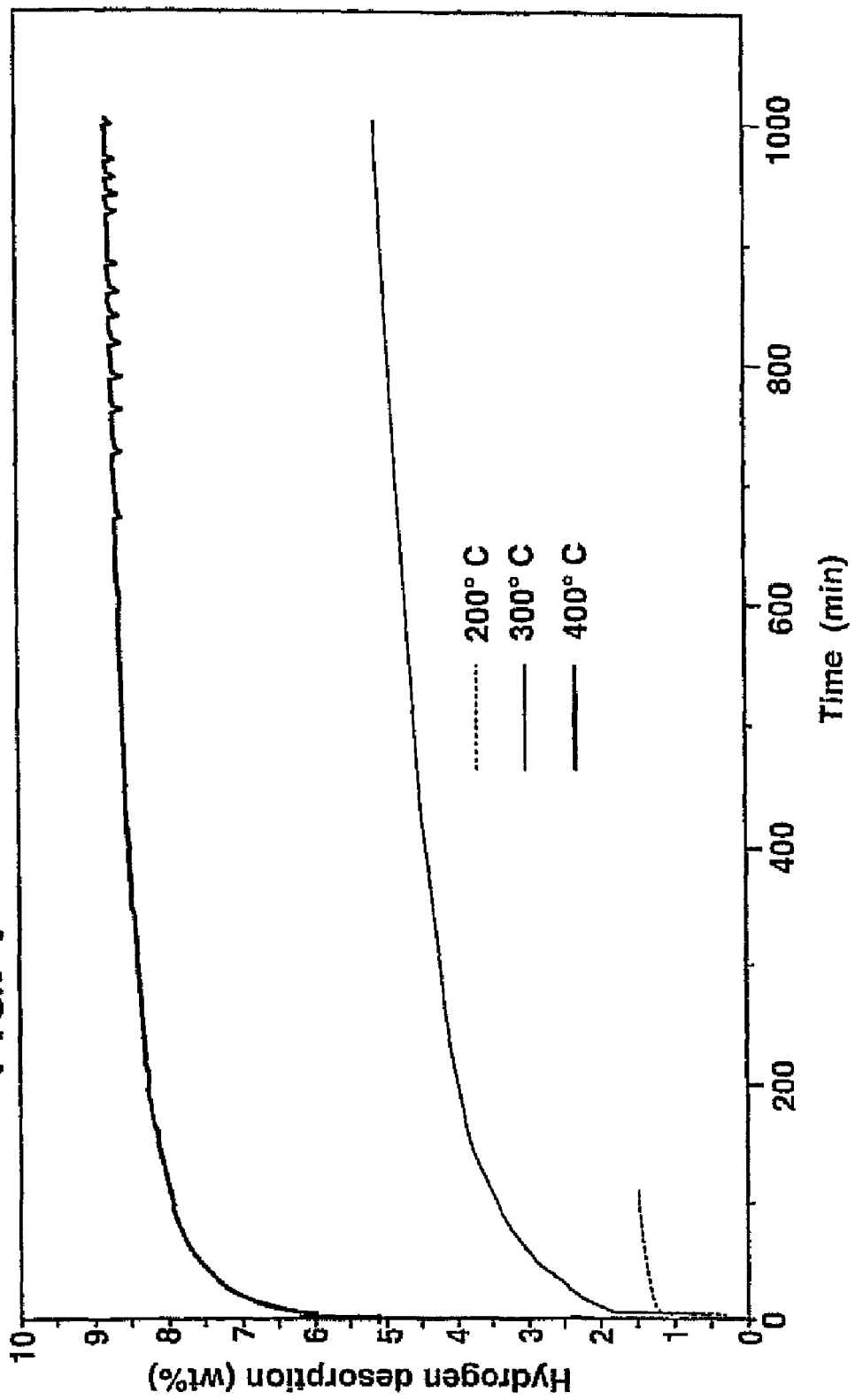
FIG. 4 is a graph setting forth desorption data for $LiBH_4$ 75%-$TiO_2$ 25% at respective temperatures of 400° C., 300° C., and 200° C.
Figure 5:
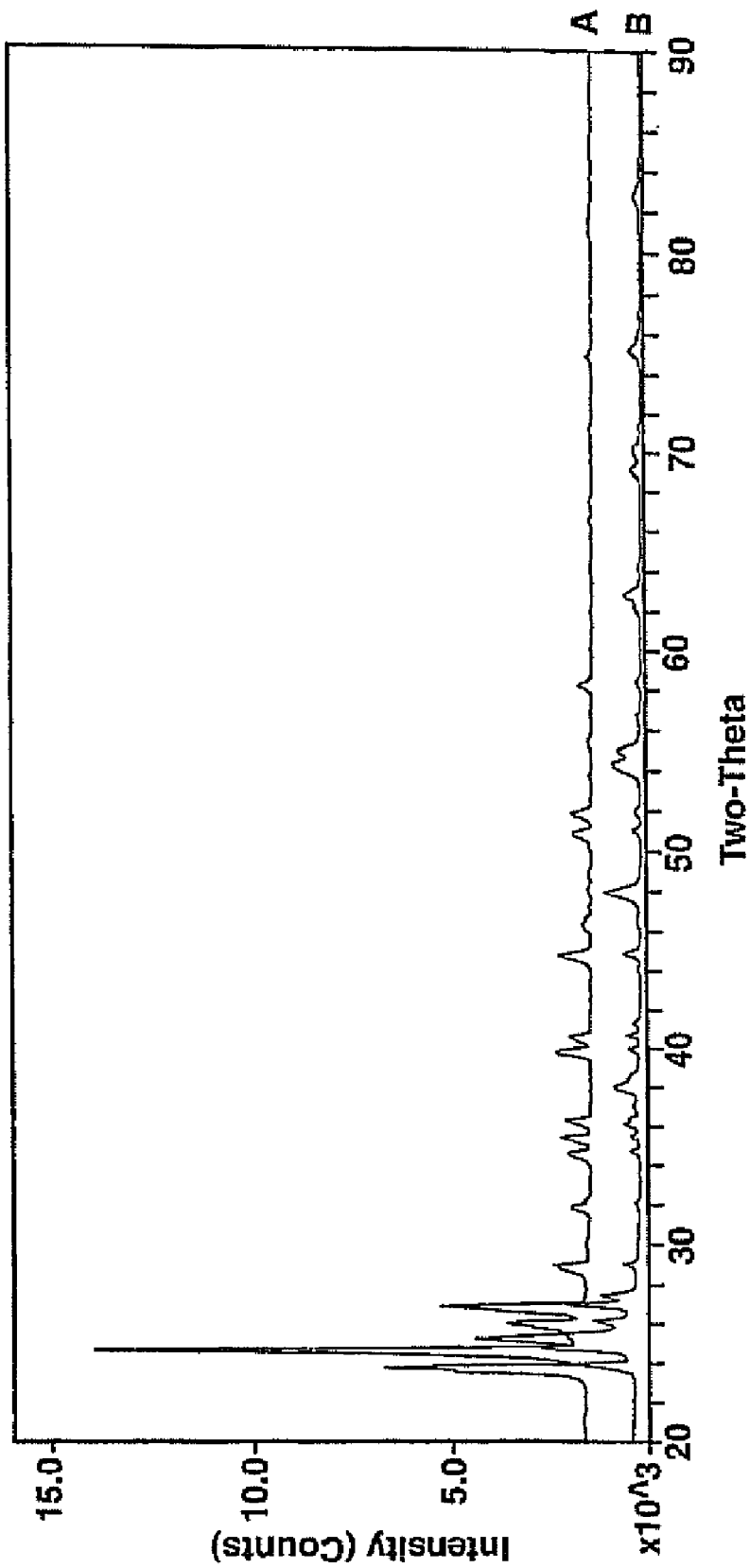
FIG. 5 is an x-ray diffraction spectra setting forth the unique crystal structure of $LiBH_4$ 75%-$TiO_2$ 25% in comparison to a sample of $LiBH_4$.

As seen in FIG. 3, the sample of $LiBH_4$ 75%-$TiO_2$ 25% exhibits reversible hydrogen cycling characteristics as indicated by the capacity in weight percent of the material in a first dehydriding and a second dehydriding cycle.

As indicated by the data set forth in the examples, the third materials exhibit a hydrogen release initiation temperature which is reduced from 400° C. to 200° C. Additionally, the third materials have shown a reversible capacity of about 6 wt % to about 9 wt % hydrogen.

As set forth below, it has been demonstrated that various metals, metal chlorides, metal hydrides, and other complex hydrides may be used as the second materials in the process to substitute a percentage of either the Li atoms or B atoms in $LiBH_4$ resulting in lower dehydrating temperatures. It is also demonstrated that the partial destabilization may bring about improvements in dehydriding and rehydriding kinetics. The process may include various steps and may include:

Step 1. A mixture of commercial $LiBH_4$ is combined with metals such as Mg Ca, Sr, Ba, and Al; metal chlorides such as $MgCl_2$, $CaCl_2$, $SrCl_2$, $BaCl_3$; metal hydrides such as $MgH_2$, $CaH_2$, $AlH_3$; or other complex hydrides such as $LiAlH_4$, $NaAlH_4$, and $Mg(AlH_4)_2$; which are collectively ball milled to achieve a reduced particle size and bring about a homogeneous mixing of the materials.

Step 2. Following the initial ball milling and mixing, the resulting mixture is sintered at a temperature up to 300° C. at a given hydrogen atmosphere (100 bar) such that the hydrogen pressure is greater than the decomposition pressure of $LiBH_4$ at the reaction temperature.

Step 3. The resulting sintered block of partially substituted material is crushed and ball milled so as to achieve a final average particle size of between about 20 to about 100 nanometers or less. As demonstrated by the data discussed below, during the final ball milling step, catalysts such as $TiCl_3$ and $TiO_2$ may be added and which provide for additional improvements in the kinetics and properties of hydrogen absorption and release.

EXAMPLE 1

Figure 6:
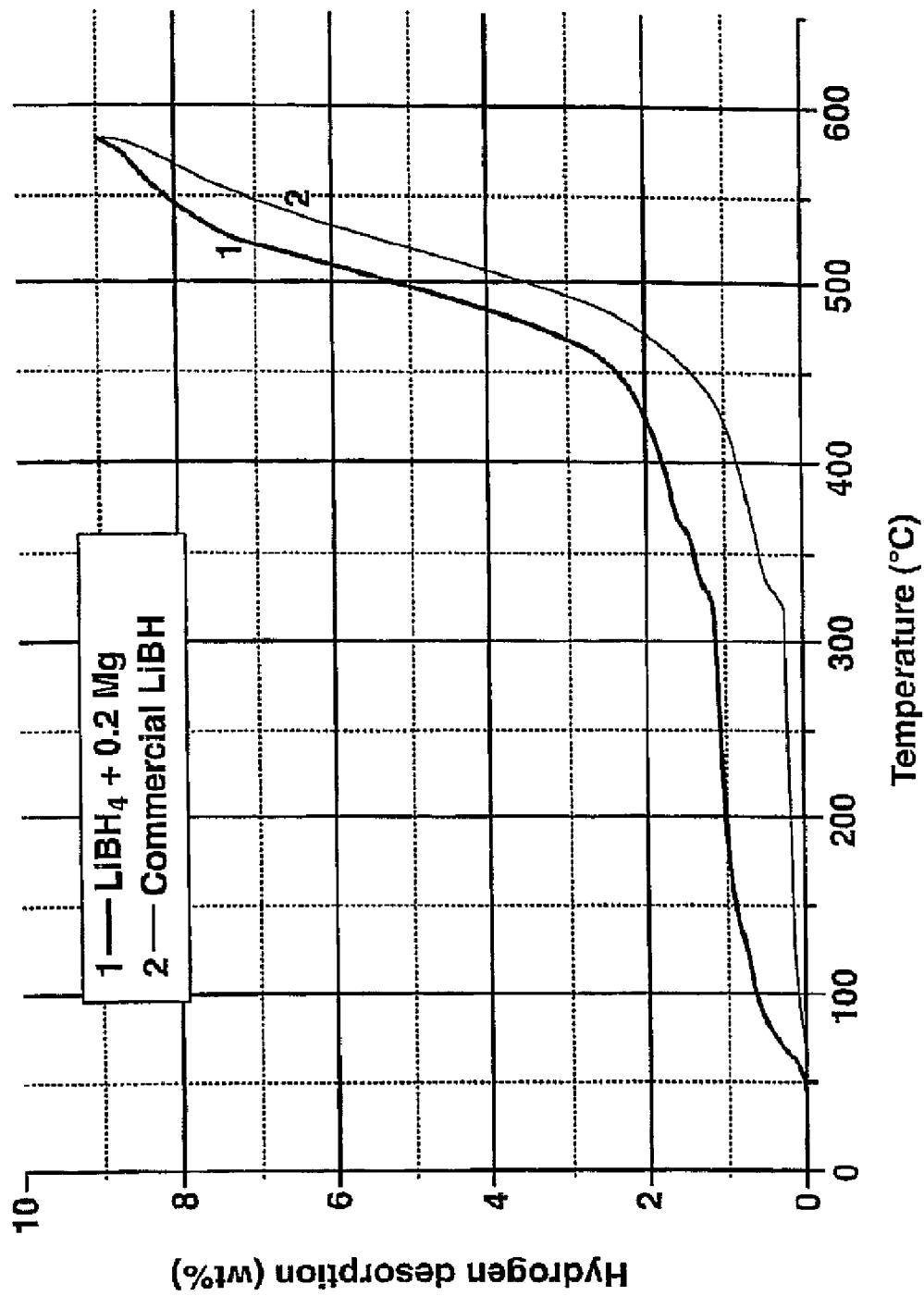
FIG. 6 is a graph comparing dehydrogenation of the destabilized and commercial $LiBH_4$ materials.
Figure 7:
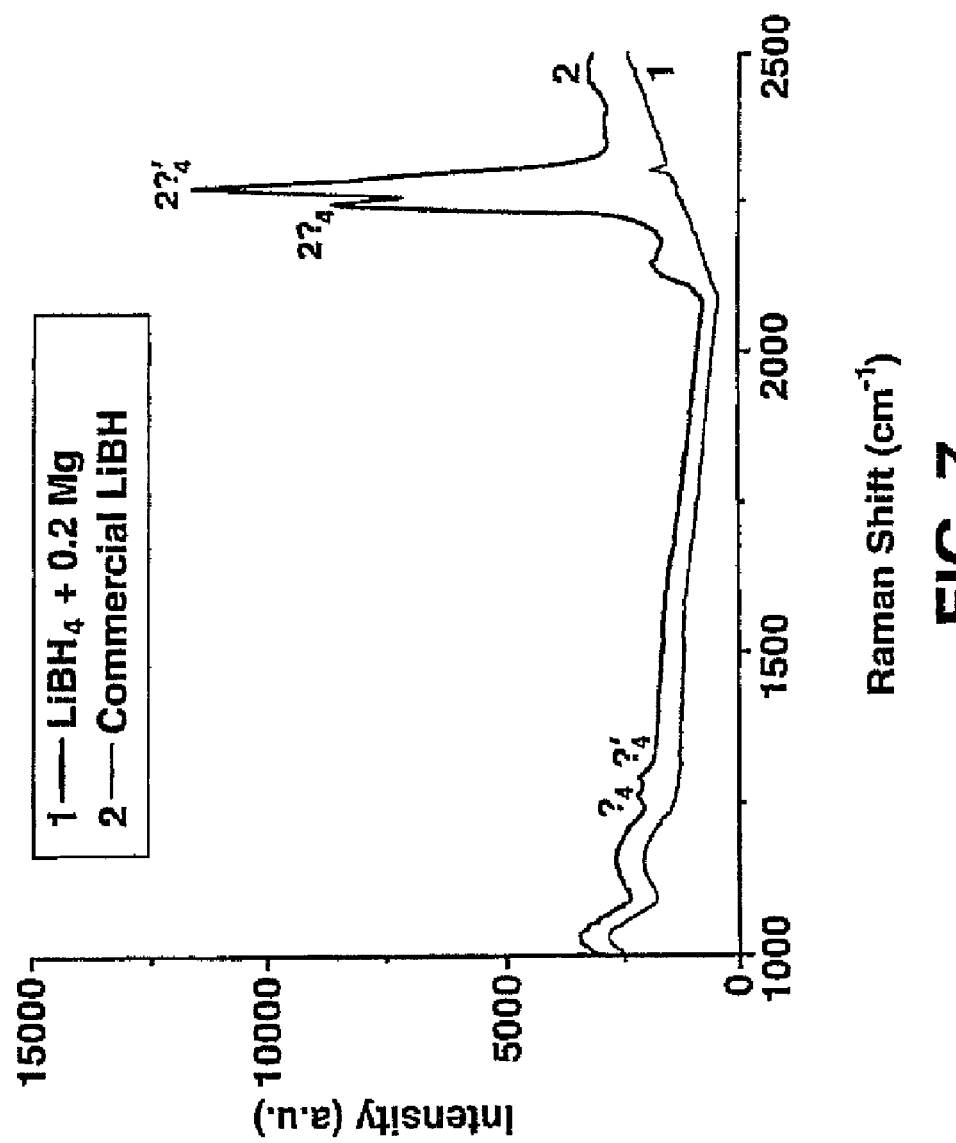
FIG. 7 is a Raman spectra comparison between the destabilized and commercial $LiBH_4$ materials.
Figure 8:
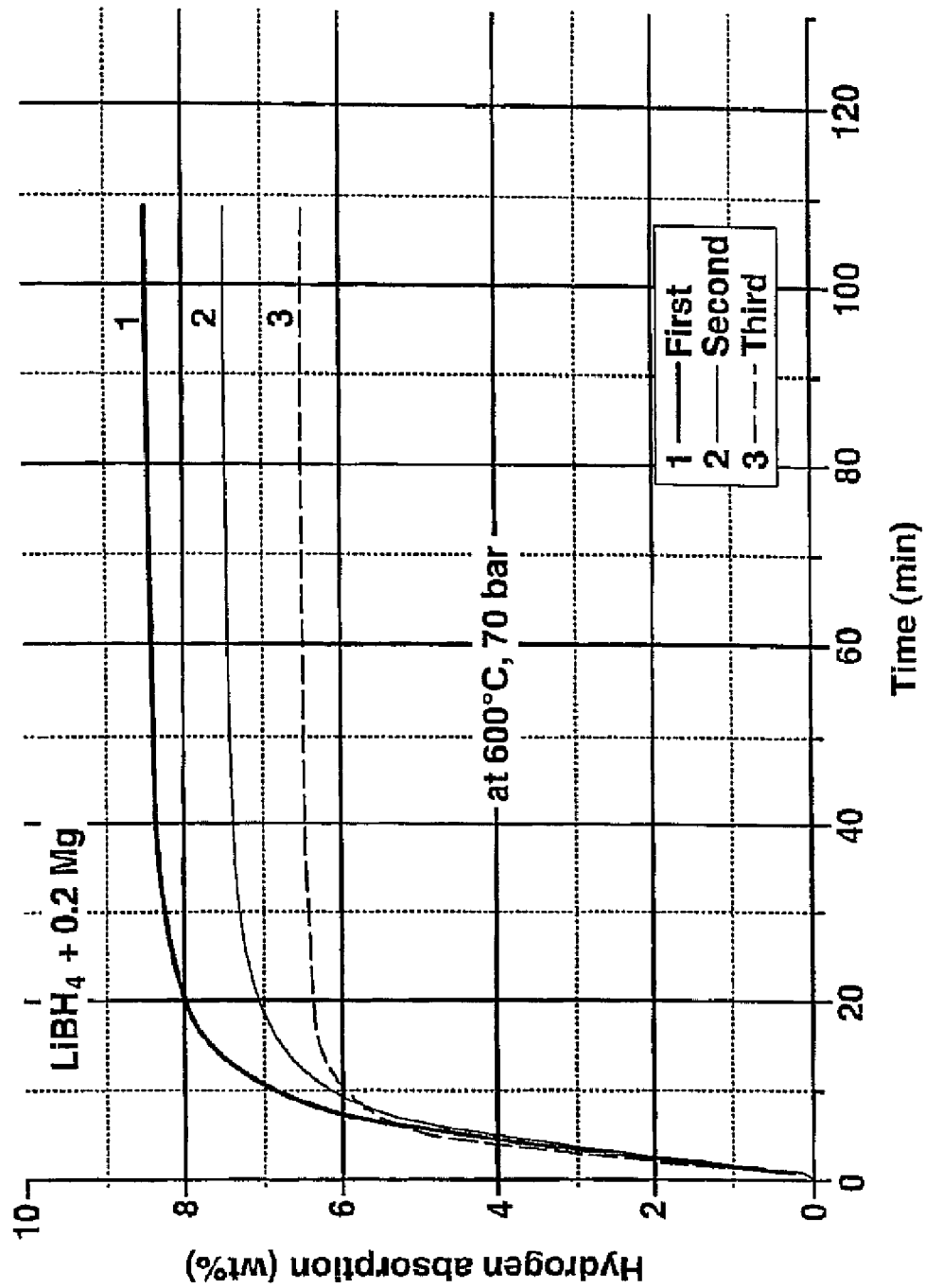
FIG. 8 is a graph setting forth the first, second, and third cycle hydrogen release characteristics of a partially substituted $LiBH_4$ in which the substituted material is $LiBH_4$ plus 0.2 molar Mg.

Using the protocol set forth above, $LiBH_4$ was mixed with 0.2 molar magnesium and used to obtain the partial substitution. As seen in reference to FIGS. 6 through 8, the destabilized material $LiBH_4$+0.2 Mg releases hydrogen at 60° C. comparing with the commercial pure $LiBH_4$ that releases hydrogen at 325° C. At room temperature, two Raman active internal $BH_4^{-1}$ vibrations $v_4$ and $v'_4$ occur at 1253 and 1287 cm$^{-1}$ respectively, and two overtones $2v_4$ and $2v_4'$ at 2240 and 2274 cm$^{-1}$, respectively as spectrum 2 shows in FIG. 7. However, the $V_4$ $v'_4$, and $2v_4$ stretching disappears from the spectrum after the addition of the destabilized $LiBH_4$+0.2 Mg. The $2v_4'$ stretching is weakened and shifted to 2300 cm$^1$ as the spectrum 1 shows and is indicative that the B—H binding strength is reduced by partial $LI^{+1}$ substitution. The weakened bond results in a lower dehydriding temperature. As further seen in reference to FIG. 8, the partially substituted $LiBH_4$ material is able to undergo multiple cycles of rehydrogenation.

EXAMPLE 2

Figure 9:
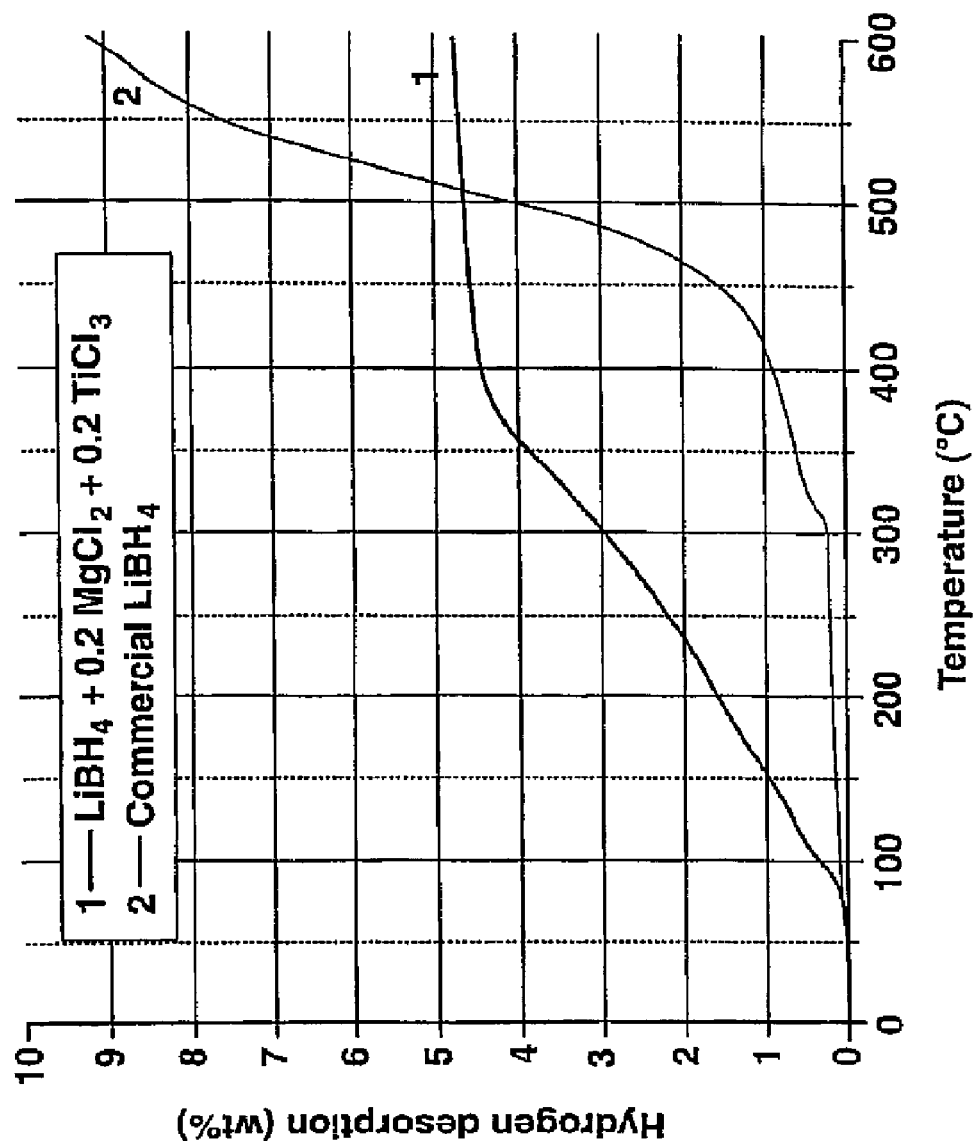
FIG. 9 is a graph comparing dehydrogenation of a destabilized $LiBH_4$ with a commercial $LiBH_4$ material.

$LiBH_4$ was combined with 0.3 $MgCl_2$ plus 0.2 molar $TiCl_3$ and is subjected to the process described above. As seen from data set forth in FIG. 9, the partially substituted product has improved hydrogen desorption release properties in terms of temperature and percent of hydrogen released at temperatures below 500° C. when compared to a commercial $LiBH_4$.

Figure 10:
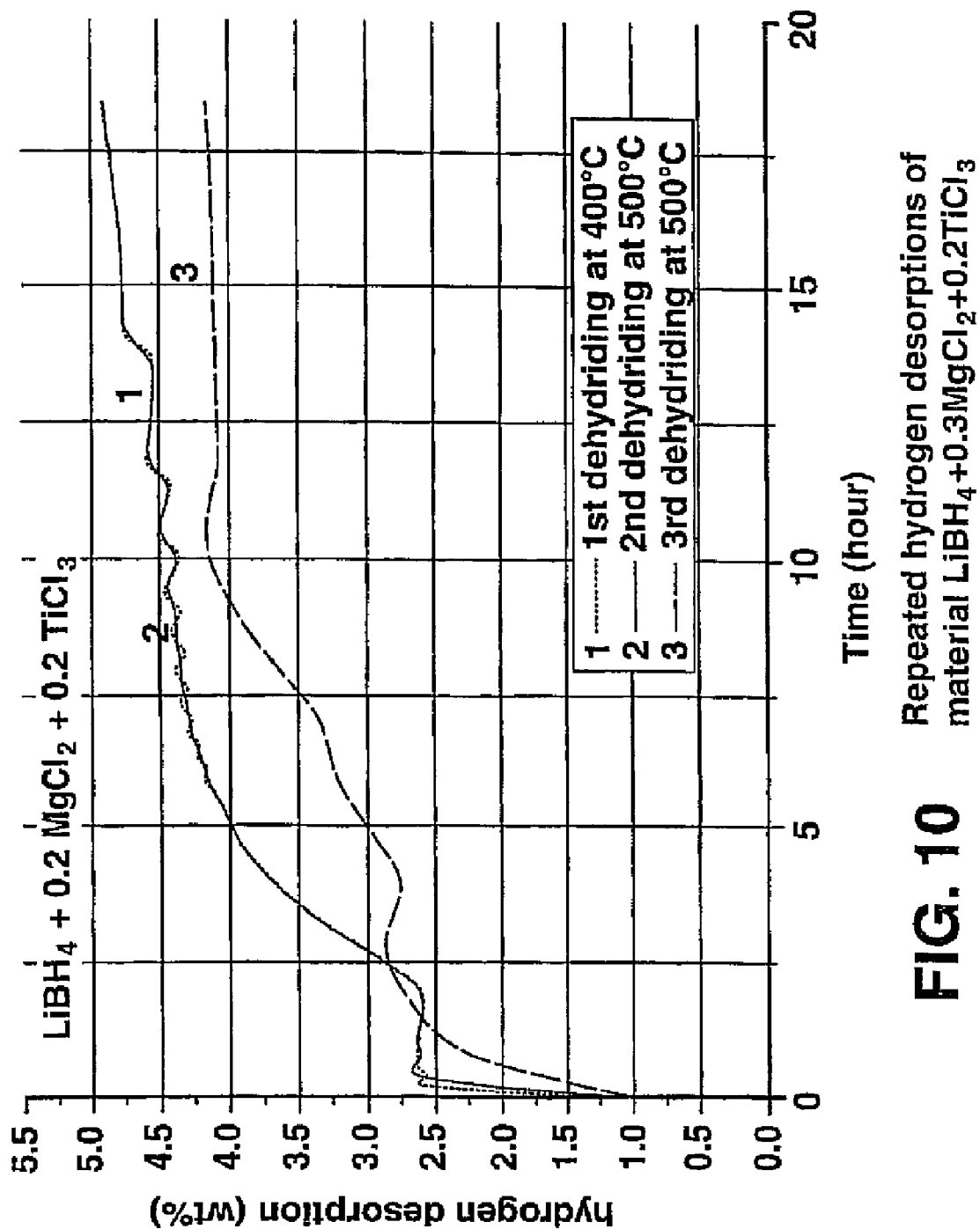
FIG. 10 is a graph setting forth the desorption data for a partially substituted $LiBH_4$ material.
Figure 11:
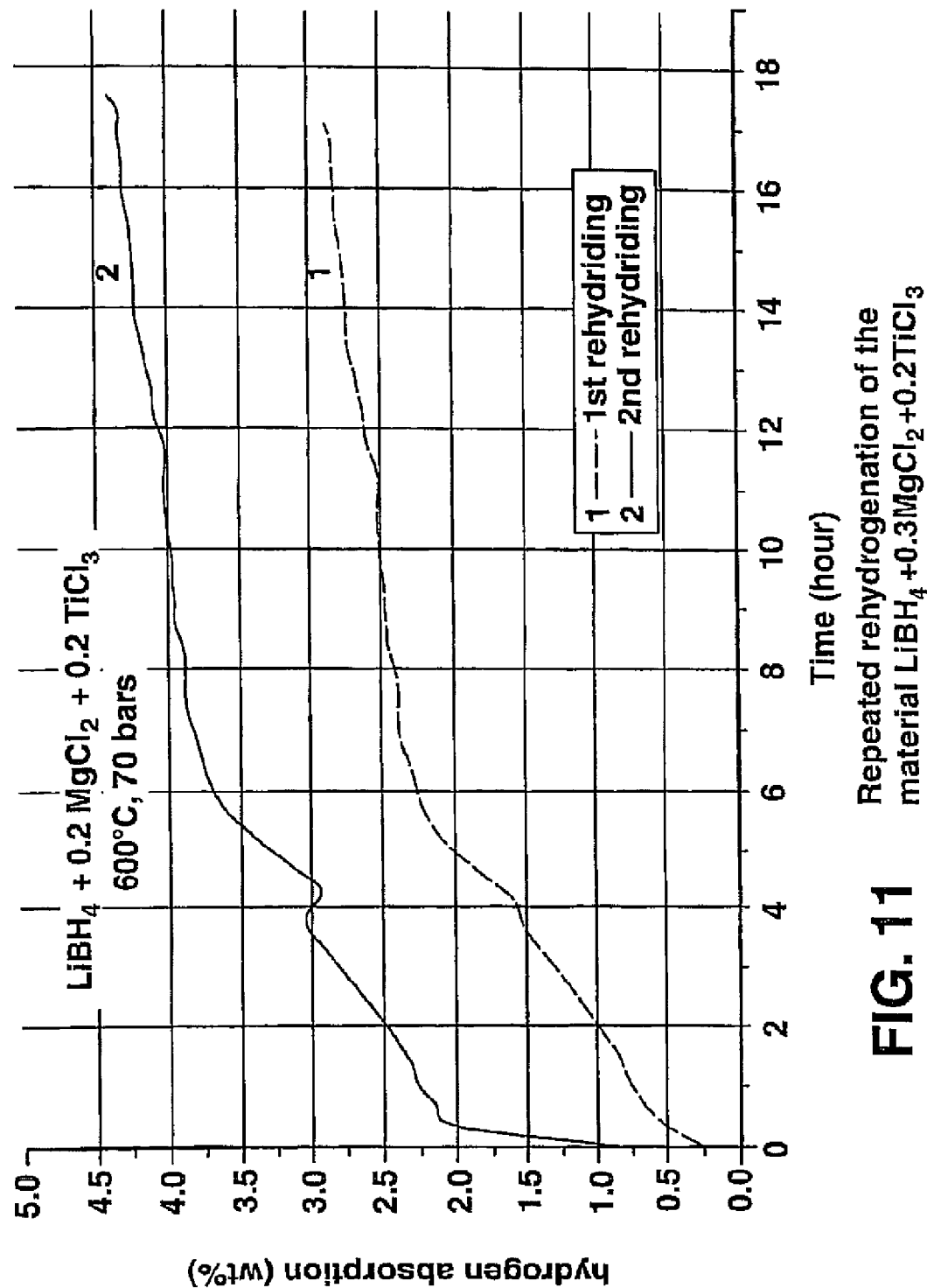
FIG. 11 is a graph showing the rehydriding capability of the partially substituted borohydride material at 600° C. and 70 bars of pressure.

As set forth in FIGS. 10 and 11, data is set forth showing the repeated desorption and rehydrogenation capabilities respectively of the partially substituted $LiBH_4$.

EXAMPLE 3

Figure 12:
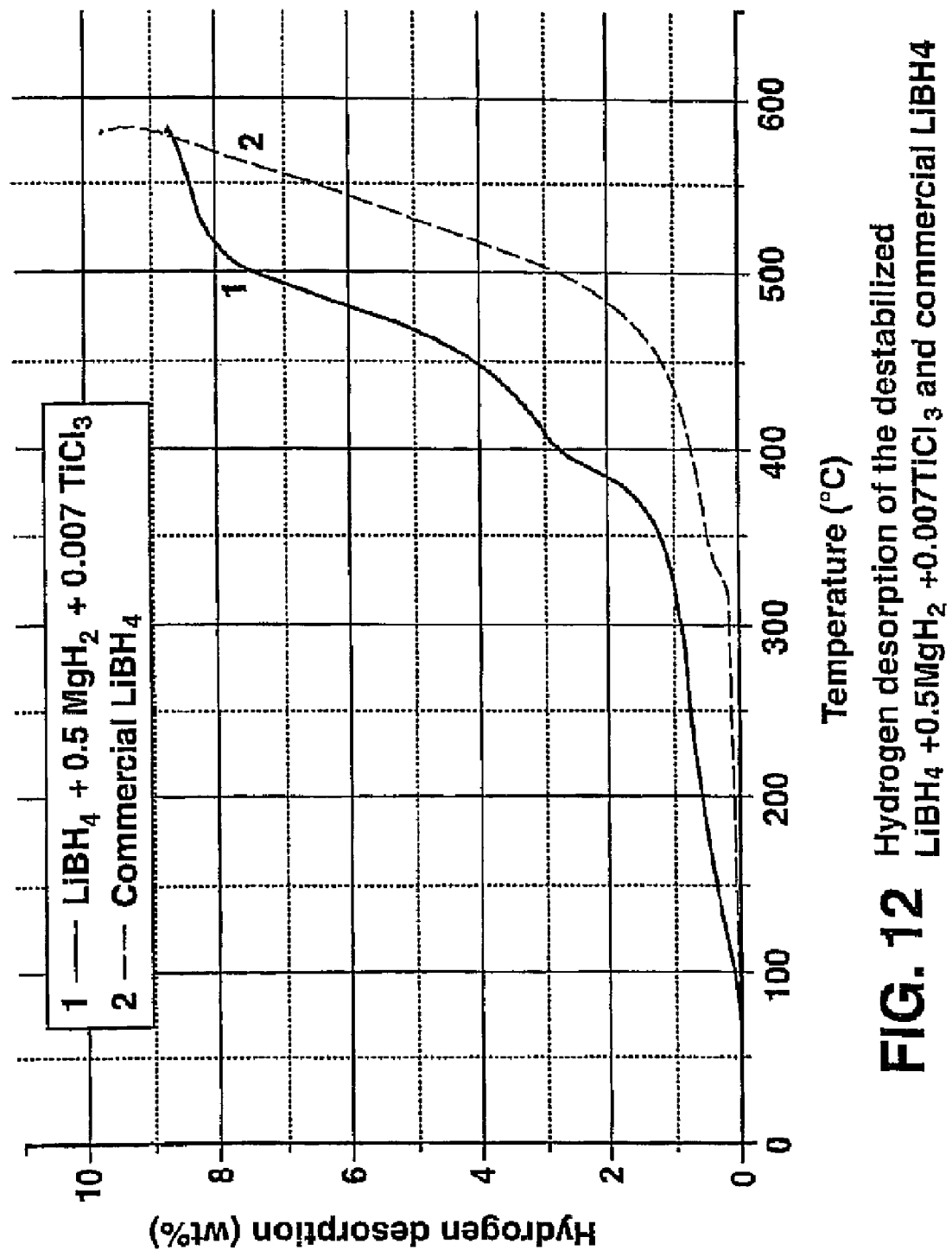
FIG. 12 is a graph setting forth desorption data for a partially substituted $LiBH_4$ with the indicated catalyst.

$LiBH_4$ was mixed with 0.5 $MgH_2$ plus 0.007 $TiCl_3$ and processed according to the steps described above. Set forth in FIG. 12 is the hydrogen desorption data of the resulting product at the indicated temperatures.

Figure 13:
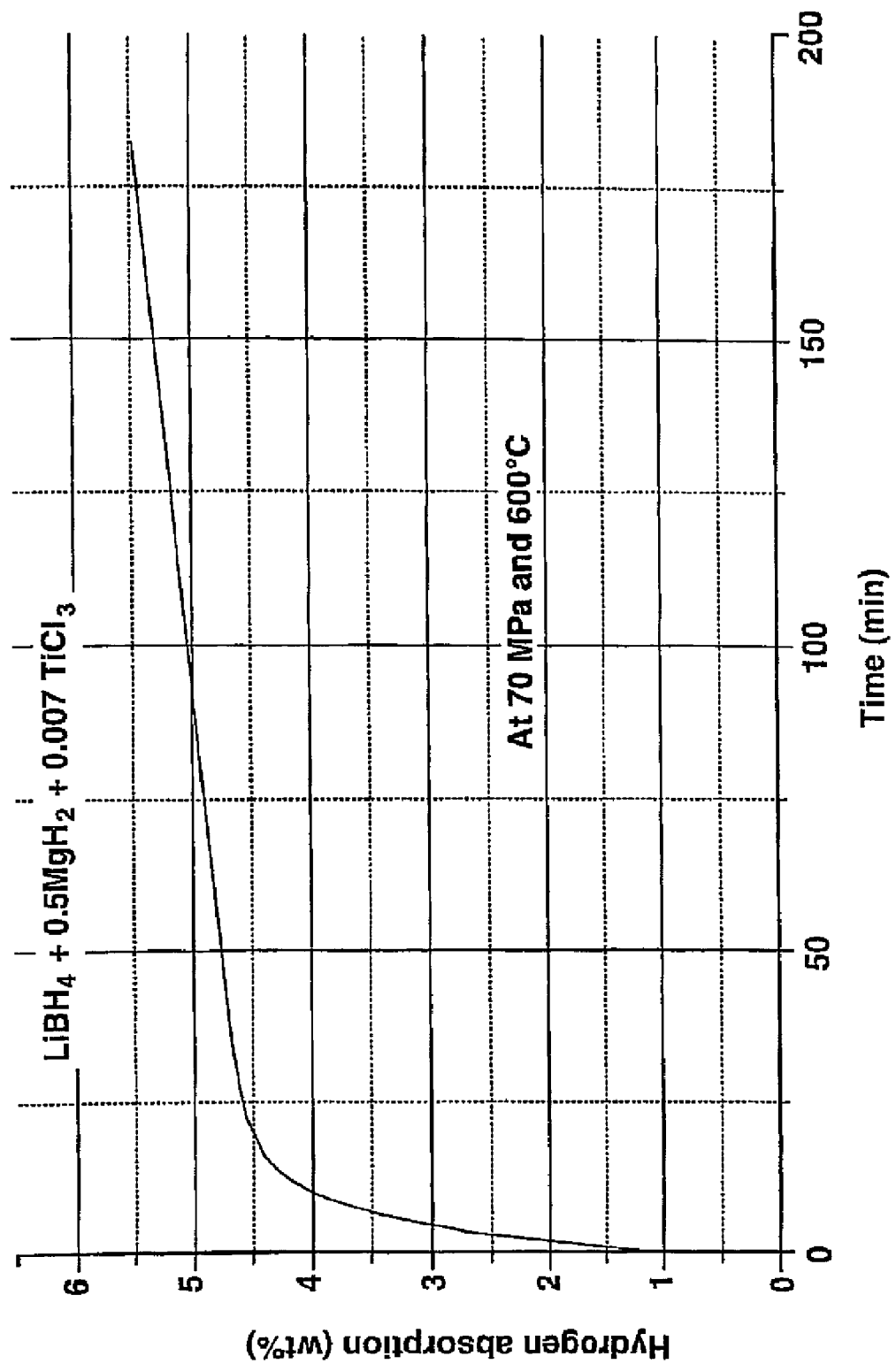
FIG. 13 is a graph setting forth rehydriding capabilities of the partially substituted borohydride and indicated catalyst.

In FIG. 13, rehydrogenation data of the partially substituted $LiBH_4$ is set forth.

EXAMPLE 4

Figure 14:
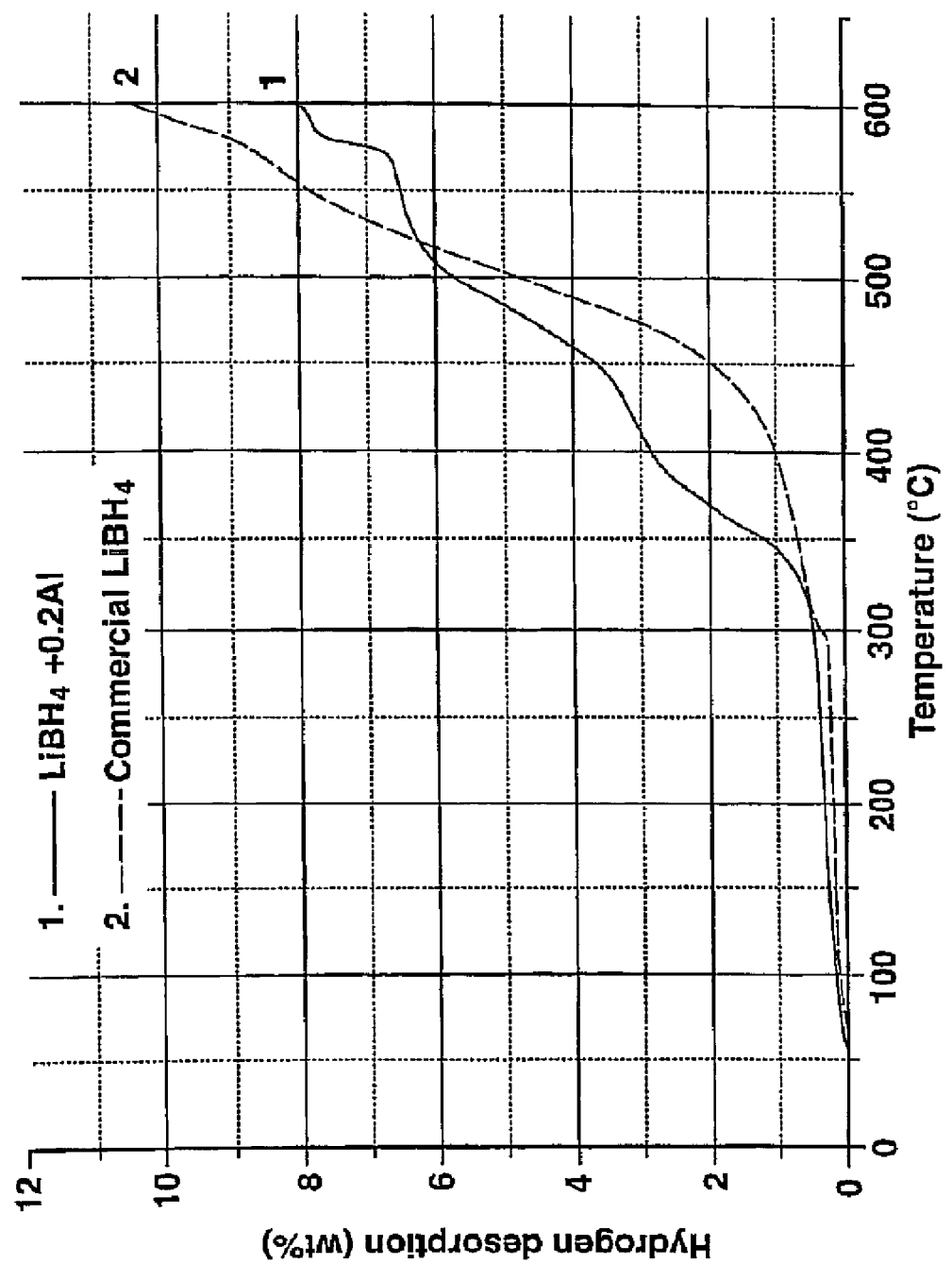
FIG. 14 is a graph setting forth desorption data for a partially substituted $LiBH_4$ with 0.2 molar aluminum.
Figure 15:
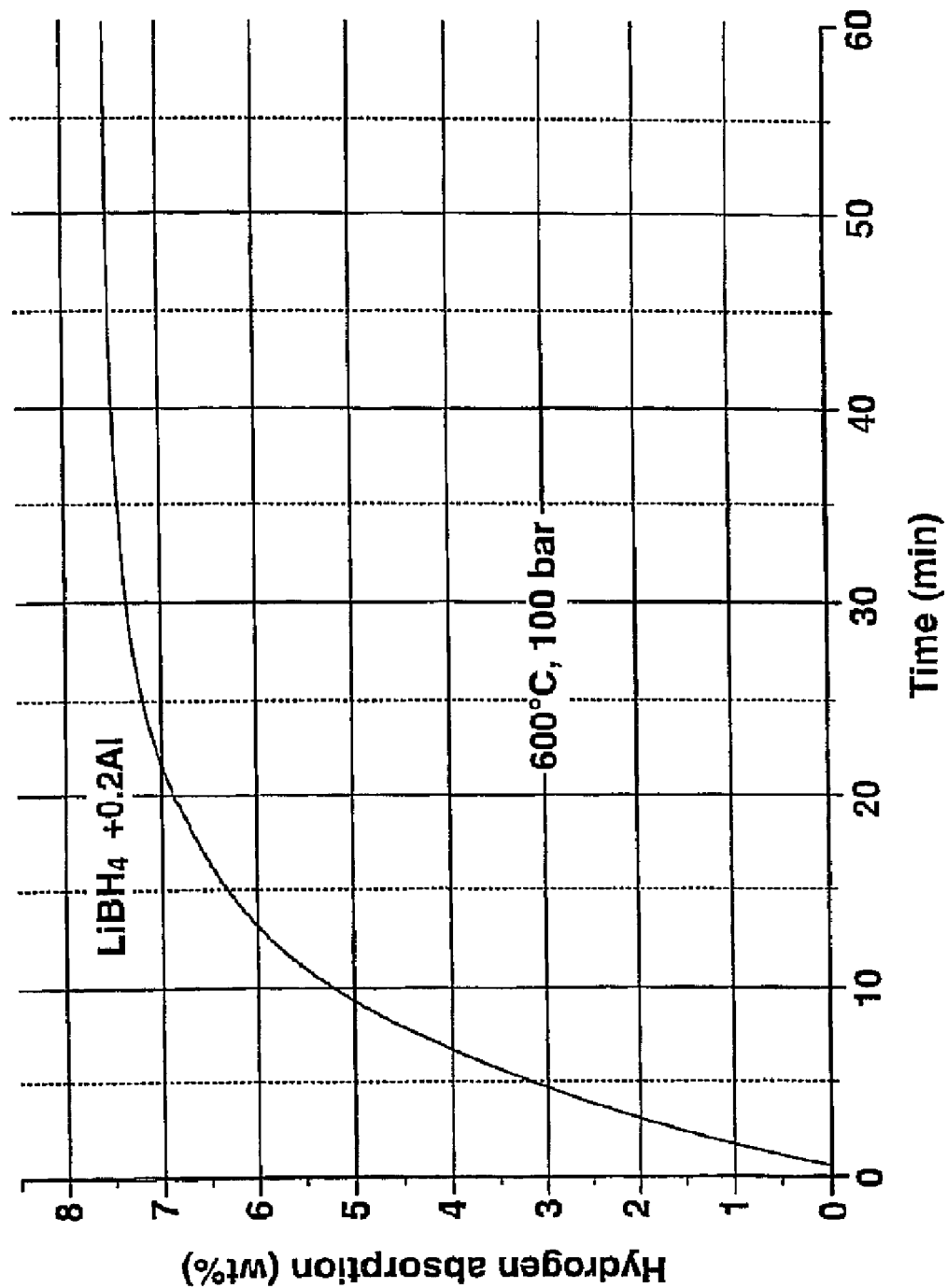
FIG. 15 is a graph showing the rehydriding capability of the partially substituted LiBH$_4$ referred to in FIG. 14 at 600° C. and 100 bars of hydrogen pressure.
Figure 16:
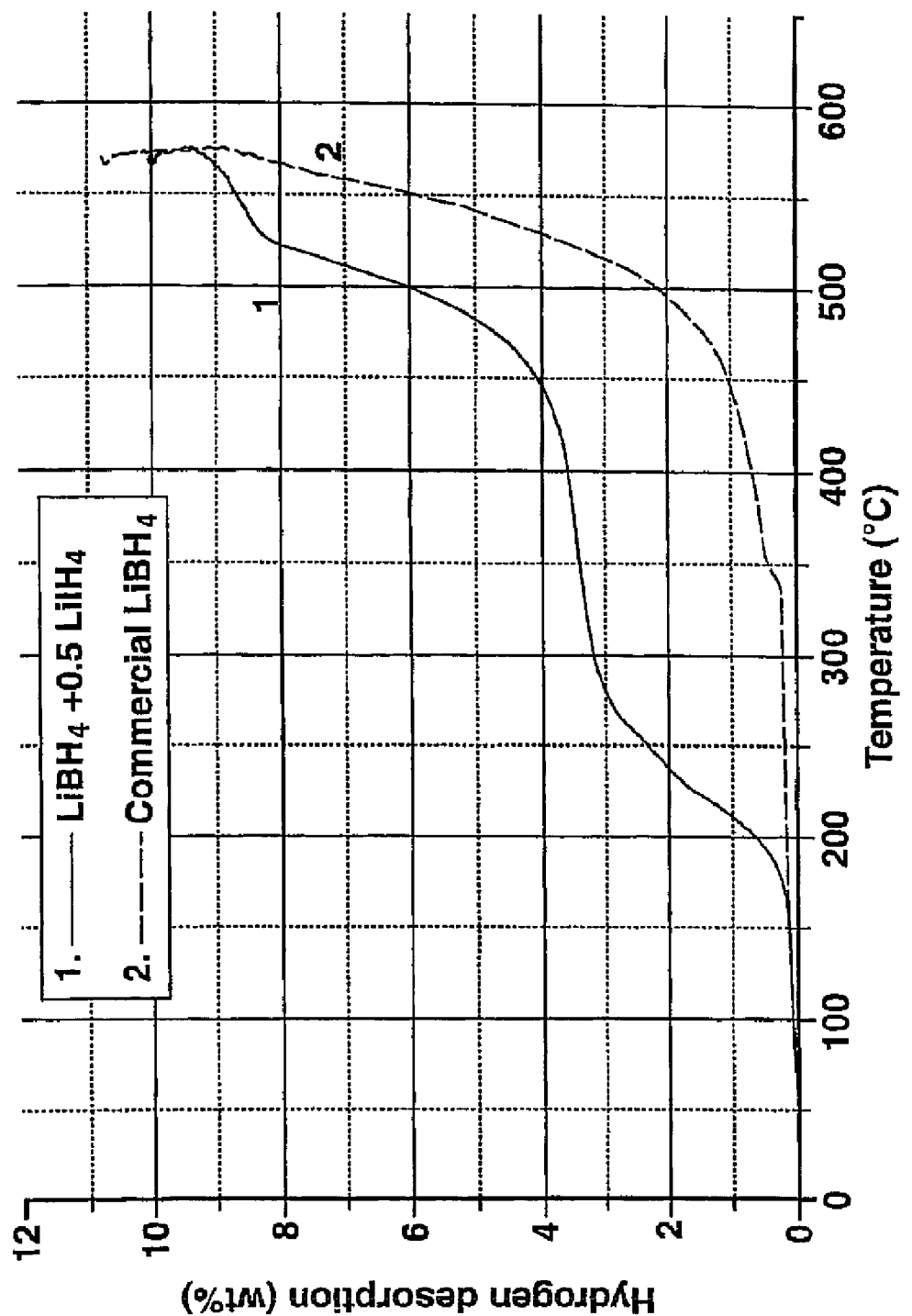
FIG. 16 is a graph setting forth desorption data for LiBH$_4$ plus 0.5 LiAlH$_4$.
Figure 17:
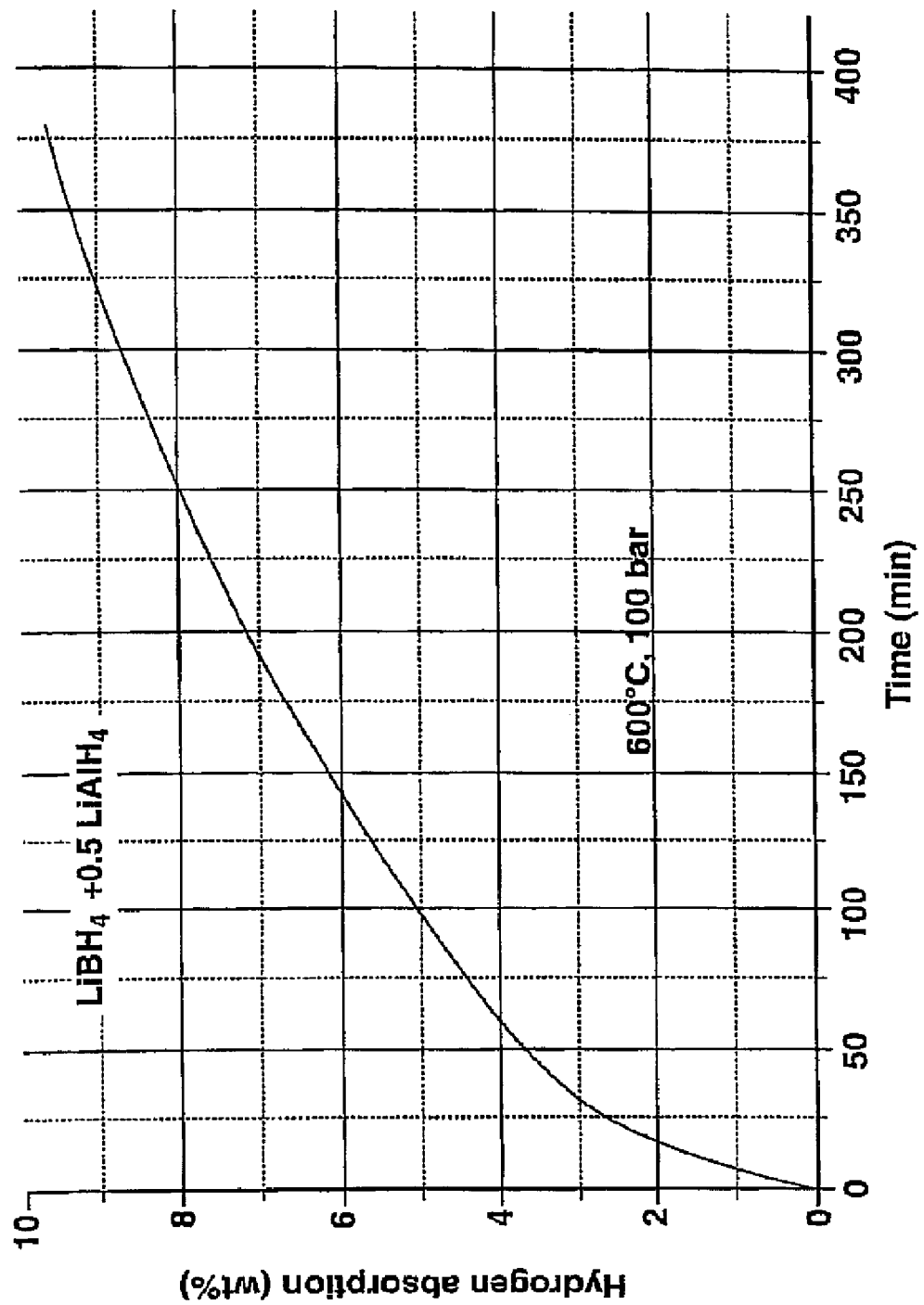
FIG. 17 is a graph setting forth rehydriding capability of a LiBH$_4$ as partially substituted with 0.5 LiAlH$_4$.

$LiBH_4$ at 80 wt % was combined with 0.2 molar Al and treated with the protocol described above. As set forth in FIGS. 14 and 15, the data on hydrogen desorption and rehydrogenation respectively is provided.

EXAMPLE 5

Figure 18:
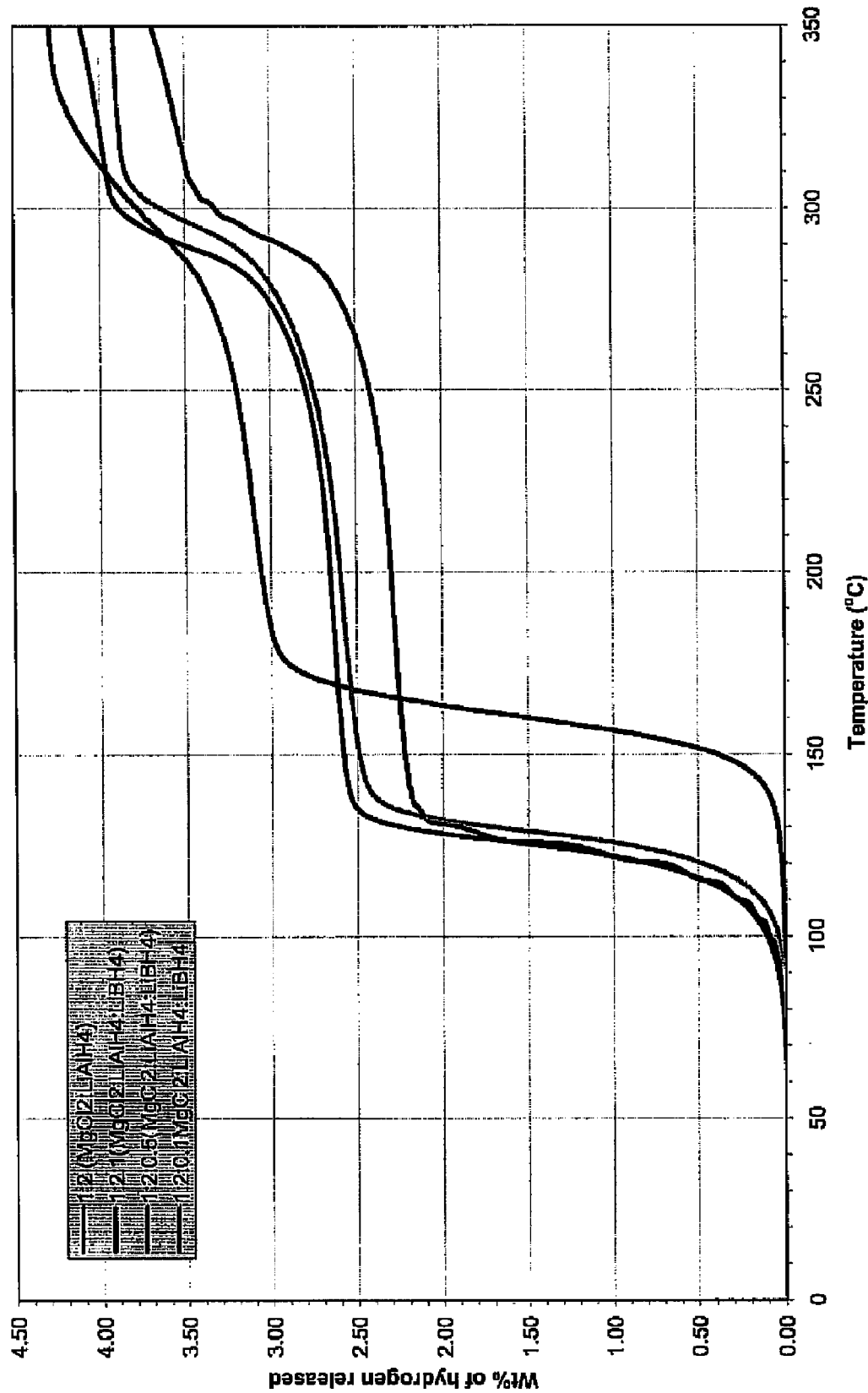
FIG. 18 is a graph setting forth desorption data for MgCl$_2$, LiBH$_4$ and LiAlH$_4$ at various molar ratios.
Figure 19:
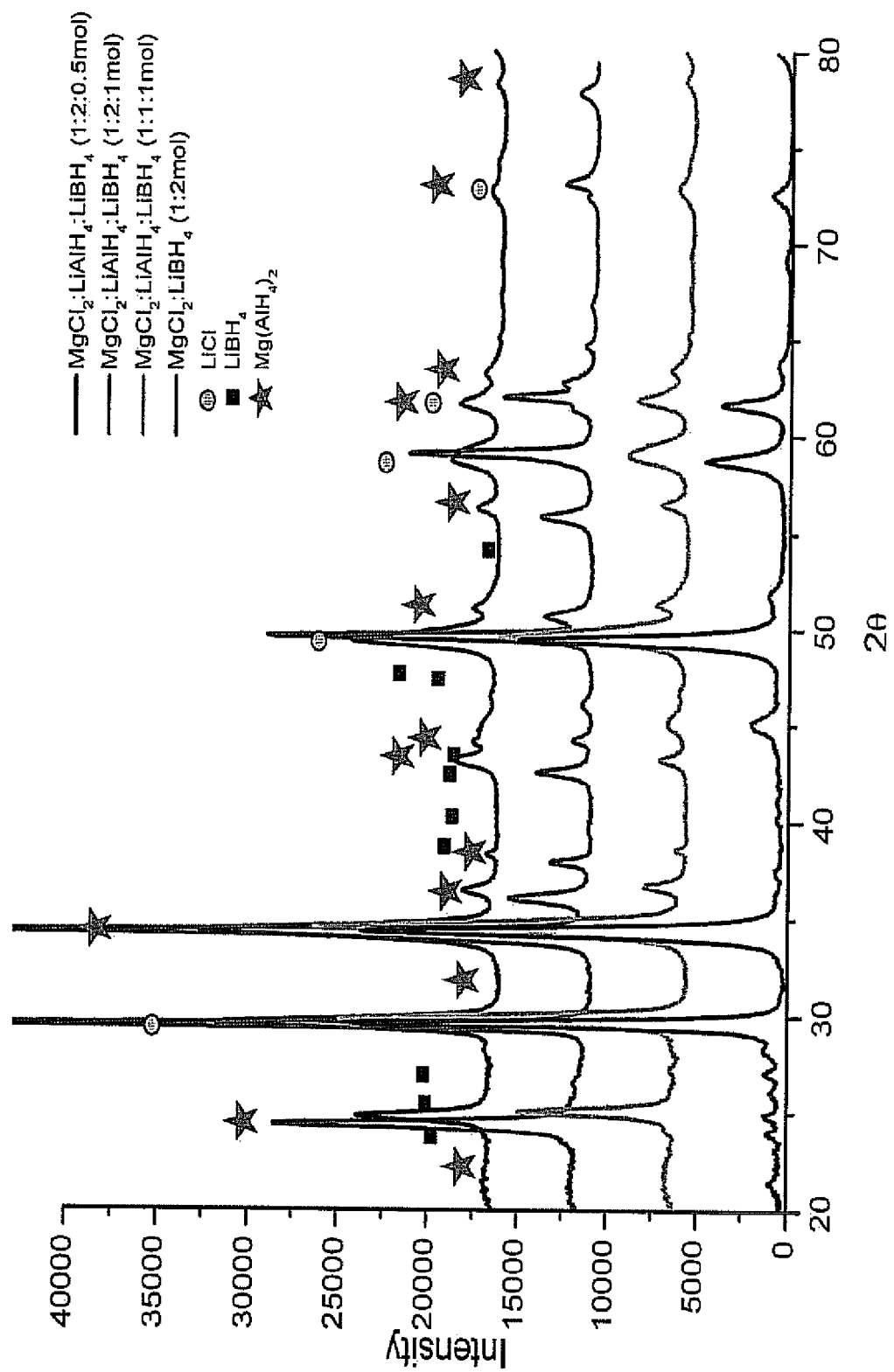
FIG. 19 is a XRD spectra comparison between the materials at various molar ratios of FIG. 17 detailing the formation of Mg(AlH$_4$)$_2$.

$LiBH_4$ was combined with $MgCl_2$ and $LiAlH_4$ and subjected to the protocol described above. Various Molar ratios of the components as indicated in FIGS. 18 and 19 were combined. As seen in reference to FIG. 18 the respective hydrogen desorption properties of the various mixtures are provided. As can be seen from the graph, the combination of $LiBH_4$, $MgCl_2$ and $LiAlH_4$ exhibits a lower release temperature in comparison to a mixture of $MgCl_2$ and $LiAlH_4$. There is at least a 50 degree Celsius difference in the release temperature of the combined materials in comparison to the alanate itself.

Referring to FIG. 19, there is shown the x-ray diffraction analysis of the various combinations shown in FIG. 18. As can be seen from the plots, the formation of magnesium alanate is shown in the presence of $LiBH_4$ and the absence of $LiBH_4$ is shown following the ball milling procedure. The Loss of $LiBH_4$ in the plot indicates a transformation of the compound. It is believed that this transformation promotes $Mg(AlH_4)_2$ material based species by lowering the release temperature.

EXAMPLE 6

Figure 20:
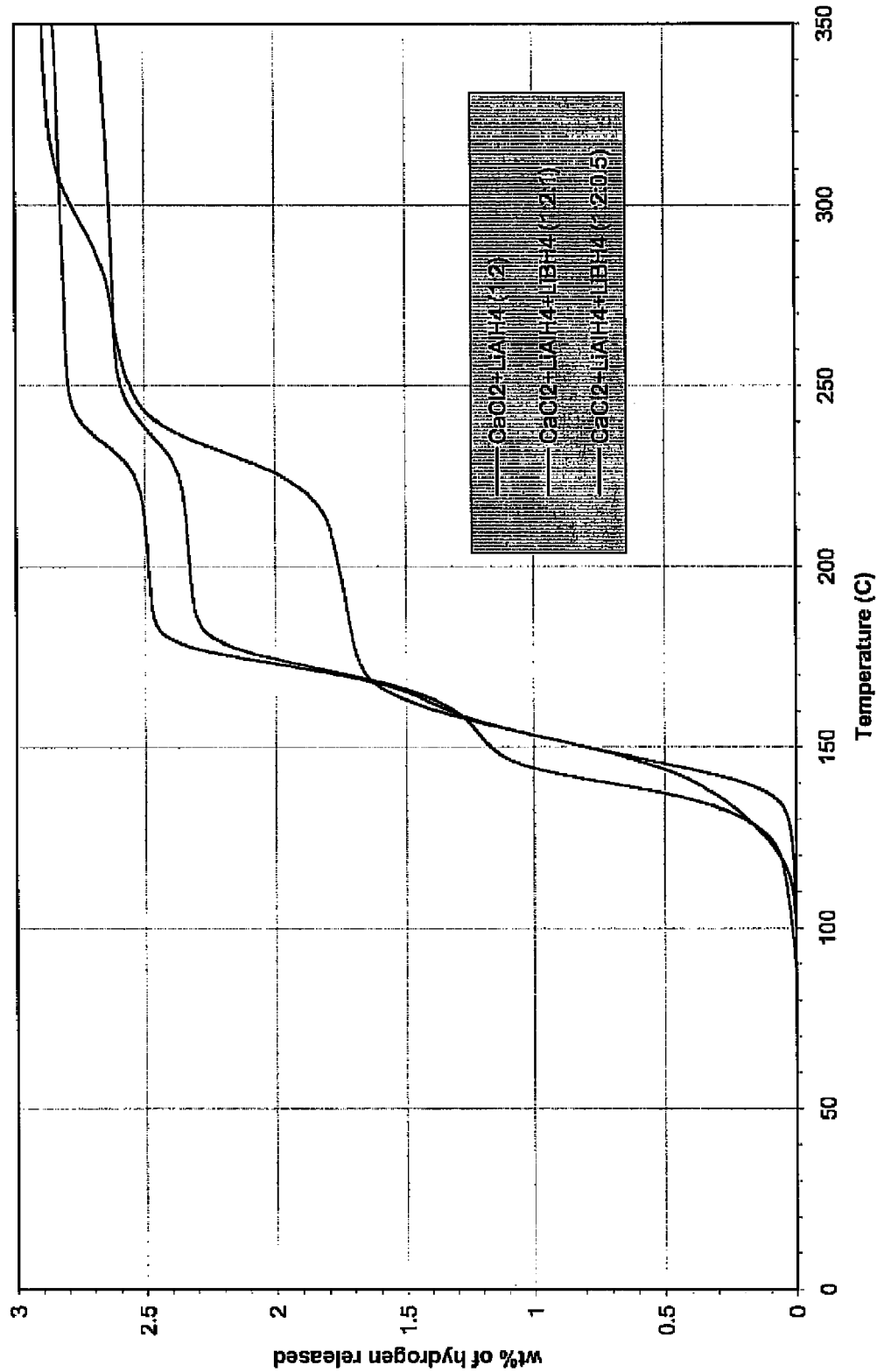
FIG. 20 is a graph setting forth desorption data for CaCl$_2$, LiBH$_4$ and LiAlH$_4$ at various molar ratios.

$LiBH_4$ was combined with $CaCl_2$ and $LiAlH_4$ and subjected to the protocol described above. Various Molar ratios of the components as indicated in FIG. 20 were combined. As seen in reference to FIG. 20, the respective hydrogen desorption properties of the various mixtures are provided. As can be seen from the graph, the combination of $LiBH_4$, $CaCl_2$ and $LiAlH_4$ exhibits a lower release temperature in comparison to a mixture of $CaCl_2$ and $LiAlH_4$.

As seen from the above examples, it is possible to use destabilization agents to partially substitute a percentage of either Li atoms or B atoms in $LiBH_4$ (or both atoms) and thereby achieve a lower dehydriding temperature than is otherwise possible using non-substituted $LiBH_4$. In addition, as noted by the data set forth in the Figures, favorable dehydriding and rehydriding kinetics can be obtained using the partial substitution protocol along with the optional addition of catalysts such as $TiCl_3$ or $TiO_2$.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole, or in part. Therefore, the spirit and scope of the appended claims should not be limited to the description of the preferred versions contained therein.

The invention claimed is:

1. A process of forming a hydrogen storage material comprising the steps of:
providing a borohydride material of the formula: $M(BH_4)_x$ where M is an alkali metal or an alkaline earth metal and $1 \leq x \leq 2$;
providing an alanate material of the formula: $M_1(AlH_4)_x$ where $M_1$ is an alkali metal or an alkaline earth metal and $1 \leq x \leq 2$;
providing a halide material of the formula: $M_2Hal_x$ where $M_2$ is an alkali metal, an alkaline earth metal or transition metal and Hal is a halide and $1 \leq x \leq 4$;
combining the borohydride, alanate and halide materials such that 5 to 50 molar percent from the borohydride material is present forming a reaction product material having a lower hydrogen release temperature than the alanate material wherein the reaction product includes a partially substituted borohydride metal cation with the alanate metal cation, or a partially substitute borohydride metal cation with the metal from the halide material and the alanate metal cation.

2. The process of claim 1 including the step of ball milling the borohydride, alanate and halide materials prior to the step combining the materials.

3. The process of claim 2 wherein the borohydride and alanate materials are milled to a particle size of from about 50 to 100 nanometers.

4. The process of claim 1 wherein the reaction product material reversibly stores hydrogen.

5. The process of claim 1 wherein when the reaction product material is rehydrided, and the reaction product material thereafter reversibly releases at least about 6 wt % hydrogen.

6. The process of claim 1 wherein the borohydride material is selected from the group consisting of: lithium borohydride, sodium borohydride, potassium borohydride, and combinations thereof.

7. The process of claim 1 wherein the alkaline earth metal is selected from the group consisting of: magnesium, calcium, strontium, barium, and mixtures thereof.

8. The process of claim 1 wherein $M_2Hal_x$ is selected from the group consisting of $MgCl_2$, $CaCl_2$, $SrCl_2$, $BaCl_3$, $ZrCl_4$, $TiCl_3$ and combinations thereof.

9. The process of claim 1 wherein $M_1(AlH_4)_x$ is selected from the group consisting of $LiAlH_4$, $NaAlH_4$, and $Mg(AlH_4)_2$.

10. A process of forming a hydrogen storage material comprising the steps of:
providing a borohydride material of the formula: $M(BH_4)_x$ where M is an alkali metal or an alkaline earth metal and $1 \leq x \leq 2$;
providing an alanate material of the formula: $M_1(AlH_4)_x$ where $M_1$ is an alkali metal or an alkaline earth metal and $1 \leq x \leq 2$;
providing a halide material of the formula: $M_2Hal_x$ where $M_2$ is an alkali metal, an alkaline earth metal or transition metal and Hal is a halide and $1 \leq x \leq 4$;

combining the borohydride, alanate and halide materials such that 5 to 50 molar percent from the borohydride material is present, the alanate and halide materials reacting in situ forming a second alanate material of the formula $M_2(AlH_4)x$;

the borohydride, alanate, halide and second alanate materials forming a reaction product material having a lower hydrogen release temperature than the second alanate material wherein the reaction product includes a partially substituted borohydride metal cation with the alanate metal cation, or a partially substitute borohydride metal cation with the metal from the halide material and the alanate metal cation.

11. The process of claim 10 wherein the reaction product material reversibly stores hydrogen.

12. The process of claim 10 wherein when the reaction product material is rehydrided, and the reaction product material thereafter reversibly releases at least about 6 wt % hydrogen.

13. The process of claim 10 wherein the borohydride material is selected from the group consisting of: lithium borohydride, sodium borohydride, potassium borohydride, and combinations thereof.

14. The process of claim 10 wherein the alkaline earth metal is selected from the group consisting of: magnesium, calcium, strontium, barium, and mixtures thereof.

15. The process of claim 10 wherein $M_2Hal_x$ is selected from the group consisting of $MgCl_2$, $CaCl_2$, $SrCl_2$, $BaCl_3$, $ZrCl_4$, $TiCl_3$ and combinations thereof.

16. The process of claim 10 wherein $M_1(AlH_4)_x$ is selected from the group consisting of $LiAlH_4$, $NaAlH_4$, and $Mg(AlH_4)_2$.

* * * * *